(12) United States Patent
Ramde et al.

(10) Patent No.: US 12,469,027 B2
(45) Date of Patent: Nov. 11, 2025

(54) ARTIFICIAL INTELLIGENCE MODEL AND DATASET SECURITY FOR TRANSACTIONS

(71) Applicant: Datacurve, Inc., Los Altos, CA (US)

(72) Inventors: Rakesh Ramde, Los Altos, CA (US); Amanjyot Singh Johar, Sunnyvale, CA (US)

(73) Assignee: Datacurve, Inc., Los Altos, CA (US)

( * ) Notice: Subject to any disclaimer, the term of this patent is extended or adjusted under 35 U.S.C. 154(b) by 0 days.

(21) Appl. No.: 18/669,109

(22) Filed: May 20, 2024

(65) Prior Publication Data
US 2024/0420124 A1    Dec. 19, 2024

Related U.S. Application Data

(60) Provisional application No. 63/467,711, filed on May 19, 2023.

(51) Int. Cl.
*G06Q 30/0645* (2023.01)
*G06F 21/62* (2013.01)
*G06Q 20/36* (2012.01)
*G06Q 20/38* (2012.01)

(52) U.S. Cl.
CPC ... *G06Q 20/38215* (2013.01); *G06F 21/6245* (2013.01); *G06Q 20/3674* (2013.01); *G06Q 30/0645* (2013.01); *G06Q 2220/00* (2013.01)

(58) Field of Classification Search
CPC .......... G06Q 20/3674; G06Q 30/0645; G06Q 2220/00; G06Q 20/38215; G06F 21/6245

USPC .......................................................... 705/44
See application file for complete search history.

(56) References Cited

U.S. PATENT DOCUMENTS

| | | | |
|---|---|---|---|
| 10,373,129 B1 * | 8/2019 | James | H04L 9/06 |
| 10,789,589 B2 * | 9/2020 | Nuzzi | H04L 9/50 |
| 11,200,569 B1 * | 12/2021 | James | G06Q 20/381 |
| 11,308,487 B1 * | 4/2022 | Foster | G06Q 20/3829 |
| 12,271,898 B1 * | 4/2025 | Arvanaghi | G06Q 20/10 |
| 2017/0344988 A1 * | 11/2017 | Cusden | G06F 21/00 |
| 2020/0234257 A1 * | 7/2020 | Mallik | G06Q 20/367 |
| 2022/0253842 A1 * | 8/2022 | James | H04L 9/50 |
| 2023/0162166 A1 * | 5/2023 | Keller | G06Q 20/02 |
| | | | 705/35 |
| 2023/0360300 A1 * | 11/2023 | De Brouwer | G06F 21/105 |
| 2024/0086382 A1 * | 3/2024 | Soon-Shiong | G06F 16/22 |
| 2024/0264996 A1 * | 8/2024 | Soon-Shiong | G06F 16/27 |
| 2025/0094944 A1 * | 3/2025 | Binder | G06Q 20/40 |
| 2025/0175523 A1 * | 5/2025 | Long | G06F 16/137 |

* cited by examiner

*Primary Examiner* — Bennett M Sigmond
*Assistant Examiner* — Michael J Warden
(74) *Attorney, Agent, or Firm* — Law Office of Dorian Cartwright; Dorian Cartwright

(57) ABSTRACT

AI data and datasets that are represented as NFTs and carry all applicable data for a dataset's provenance, authenticity, and ownership. NFTs are used to validate datasets useful in AI training and can also be used to identify datasets that include faulty, biased, or otherwise erroneous data to improve predictive usefulness and reliability in decision making from the AI models.

20 Claims, 9 Drawing Sheets

ARTIFICIAL INTELLIGENCE MODEL AND DATASET SECURITY FOR TRANSACTIONS

CROSS-REFERENCE TO RELATED APPLICATIONS

The invention claims priority under 35 USC 119 (e) to 63/467,726, entitled BIOMETRIC AND ARTIFICIAL INTELLIGENCE DATASET SECURITY FOR TRANSACTIONS, and filed May 19, 2023, by Ramde et al., the contents of which are hereby incorporated in its entirety.

FIELD OF THE INVENTION

The invention relates generally to computer networks, and more specifically, to protect and secure artificial intelligence models and datasets used to train the models for inference via cryptographic techniques.

BACKGROUND

Artificial Intelligence models and datasets used to train them are known. It is also known that such AI models and datasets require careful curation, preprocessing, and validation to ensure their reliability, robustness, and business and ethical alignment with intended applications. With the advent of Large Language Models (LLMs), the field of natural language processing has witnessed a significant leap forward. These powerful models, trained on vast amounts of text data, possess remarkable capabilities in understanding and generating human-like text. LLMs leverage deep learning architectures, such as transformers, to capture intricate patterns and relationships within language, enabling them to perform tasks like text generation, summarization, translation, and question answering with unprecedented accuracy. However, the development of LLMs poses challenges related to computational resources, data privacy, and potential biases inherited from the training data. For the purposes of this invention, models refers to predictive AI models, or generative AI models such as LLMs.

AI training datasets are collections of data that are used to train and test artificial intelligence models. These datasets typically consist of a large amount of structured or unstructured data, such as images, text, audio, or video. AI datasets are critical for the development of artificial intelligence models, as they provide the raw material needed to teach the models to recognize patterns, make predictions, and ultimately ensure that the models can make their own decisions without human interventions. The quality and size of the dataset can have a significant impact on the performance of the resulting AI model. There are many publicly available AI datasets, such as the MNIST or ImageNet datasets for image recognition or the COCO dataset for object detection. In addition, many organizations and companies create their own proprietary datasets for specific applications, such as healthcare or finance.

It is important to note that AI datasets can also raise concerns, particularly around issues such as bias, privacy, objectionable content, sexist, discriminatory, hallucinations, accuracy and security. Therefore, it is important to approach the creation and use of AI datasets with care and to ensure that they are developed and used in a responsible manner. As such it is important to keep them secure to ensure their integrity and protect sensitive information they may contain. If the datasets comprise faulty, biased, or otherwise erroneous data, the predictions and the decision making from the AI models are bound to be biased, discriminatory, objectionable or outright erroneous. This can also be a major security issue if bad actors can deliberately alter datasets or the model training pipelines and processes for their own nefarious purposes.

Different methods exist for adding security to datasets. Differential privacy is a technique that adds random noise to a dataset to protect the privacy of individuals in a dataset and is deployed, for example, with healthcare datasets. Federated learning and multiparty computation are techniques where multiple entities or devices collaborate to train an AI model without sharing the underlying data. Homomorphic encryption allows for the processing of encrypted data without the need to decrypt it first. There are various other similar techniques that while allowing for protecting or shielding some data, do not overall contribute meaningfully to the transparency, provenance, or utility of the overall data sets. In addition, generative models can be used to create synthetic training datasets that capture the statistical properties of real data without directly exposing sensitive information, reducing apparent privacy risks. However, when mixed with real data, it is almost impossible to know where the original training data came from and whether it may have been altered from its original state at all. None of the techniques described above are useful when it comes to fundamentally securing the provenance, lineage, and ownership of the dataset or the model itself. These are fundamental to the robustness of the data contained in the datasets.

In an enterprise environment, there are various stakeholders who have a need to know about the artificial intelligence models. The executive leadership of any enterprise need to understand the strategic implications of AI adoption, align it with the overall business goals, and provide top-down support and resources, including budgeting for running these models, which can be extremely expensive. IT professionals, data engineers, and data scientists need to understand since they are ultimately responsible for building and maintaining the AI infrastructure, managing data pipelines, and ensuring the models' performance and scalability. Heads of different business units or departments need to be informed about how AI can enhance their processes, products, or services, and provide domain expertise to ensure successful AI adoption. Professionals responsible for risk management, compliance, and governance must assess the potential risks associated with AI systems, such as bias, security, and regulatory compliance. Security professionals must evaluate the AI systems' vulnerabilities, implement appropriate security measures, and ensure compliance with data privacy regulations. Lawyers and IP professionals should review the legal implications of AI deployment, such as data rights, model ownership, and potential liability issues.

Cross functional data coordination and cooperation across different departments and teams, such as IT, data science, business units, risk management, and legal is a complex task. Often legacy enterprise infrastructure may not be compatible with modern AI technologies, requiring significant investment in upgrading or replacing existing systems. Organizations also lack the necessary AI skills and expertise within their workforce, making it difficult to implement and maintain AI solutions while simultaneously monitoring and governing them effectively. Ensuring the security and privacy of AI systems, particularly those handling sensitive data, can be a complex challenge, requiring robust risk assessment, mitigation strategies, ongoing monitoring, and stringent access controls. complexity of these without properly accounting for these, it is almost impossible to provide an accurate audit or determine the costs of such AI implementations.

Therefore, what is needed is a robust technique for protecting the security as well as other elements of enterprise systems such as AI models and datasets as noted above.

SUMMARY

To meet the above-described needs, methods, computer program products, and systems for protecting AI datasets and data contained therein with private keys for crypto wallets and/or with user biometrics.

In one embodiment, AI datasets and the data comprising the datasets along with subsets of such data are represented, packaged and associated with non-fungible tokens (NFTs). These AI datasets can correspond to any application or data source including but not limited to healthcare, weather, image processing, financial information, natural language processing, speech recognition, robotics, machine learning, or any other types of information or datasets. In general, AI datasets are used in any application that requires the training of AI models to perform specific tasks. Such AI datasets for training purposes are relevant to the application for which the models need to be trained for. For example, medical datasets cannot generally be used to train financial models. These datasets can be generated in a variety of ways. Data can be collected from a variety of sources. For example, for computer vision, images can be collected from public data sets, social media or other online sources. A business developing a proprietary system may create original proprietary datasets. For example, enterprises generate vast amounts of logs from various sources, including applications, databases, networks, and infrastructure components. They also store vast amounts of unstructured metadata regarding the above mentioned deployments. These pieces of information can collectively be invaluable in gaining insights and monitoring the performance, security, and compliance of AI deployments within the organization. Additionally, such information can be used for auditing purposes, ensuring that AI systems are functioning as intended and adhering to regulatory and ethical guidelines. However, such information may be scattered across the enterprise systems, in various cloud repositories, or across business units, or firewalled for security. As such, a person skilled in the art will recognize that this information is not readily available or transparent to extract any meaningful insights from it directly. Managing and extracting value from these large volumes of log data can be challenging, requiring robust log management solutions, advanced analytics capabilities, to derive any meaningful insights.

In some cases, it may be difficult to collect enough data for a specific task. In such cases, synthetic data can be generated to augment the dataset. For example, in computer vision, synthetic images can be generated using 3D modeling software or image manipulation techniques. In one embodiment, such assets or a collection of such assets may be packaged as a digital asset and stored on a blockchain as an NFT. New AI models such as LLMs can be efficient at generating large amounts of synthetic data as well.

Once the data is collected or synthesized, it is labeled to train the AI models. This involves assigning labels or annotations to the data, such as object bounding boxes, text sentiment scores, or speaker identification tags. Data labeling can be done manually, using human annotators, or automatically using some predetermined criteria. Depending on the available data format, there may be additional data cleaning, formatting, and preprocessing tasks that may need to be performed. Such clean labeled data is necessary to train the AI models.

For example, in one embodiment, each piece of data can be represented as a non-fungible token NFT and data labels assigned to each piece of data along with other properties or description of the data, or the data itself in some cases, serve as metadata for the NFT. As such, for various data pieces that share the same metadata, provenance or other similar characteristics, a collection of data, or a dataset, can be created. Data corresponding to different labels or with different provenance can also be put together in a dataset if required. For example, weather data for the entire month of July can be collected. Each day can be represented as an NFT. Or data from July 1-July 7, for example, can be grouped together as a separate NFT to create a weekly dataset with its own metadata and labels. Further, data from all days of the month can be grouped and represented as a monthly dataset with its own NFT, metadata and labels. This can also be achieved by grouping the various NFTs corresponding to weekly datasets and composing a new NFT corresponding to a monthly dataset, for example by using ERC998, ERC6551, ERC4337, or any other relevant standards for NFTs (or an equivalent standard on a non-EVM blockchain). Synthesized data and actual primary data can be labeled differently, and this distinction can be retained and explicitly made available when various individual data pieces are combined to form datasets. For example, when transparently recorded as NFTs, anyone can ascertain that a particular dataset may consist of 60% primary data and 40% synthetic data. This information is transparent and part of the metadata and may be readily available for governance, reporting, and audit purposes.

In addition to data synthesis, data can also be augmented to improve the accuracy and robustness of the data models. For example, in computer vision, images can be flipped, rotated, or zoomed to create variations of the original data. This can also be captured and made available as the metadata for an NFT that may be generated from such augmented data.

In one embodiment, datasets can be created by various entities working collaboratively. In such a case, with the present invention, each piece of data can be verified and attributed to the responsible entity and the aggregate information of the sources of data can be attributed transparently to the users of such data. This resolves the issue of ownership of the underlying data. As such, if the datasets are commercially sold or traded, the revenues, profits, or royalties from those can be objectively shared with the owners or contributors of the data. Further, such datasets represented as NFTs can further be access controlled to allow only certain other entities to access. Other security models such as differential privacy or federated learning techniques can still be used to keep data private. The advantage of representing the entire dataset(s) as NFTs is to ensure that the provenance, ownership, attribution, and authenticity of the underlying data has been verified and can be relied upon as entities build more complex models that use such data as a base. The disadvantage of not doing so is apparent when entities spend millions of dollars on faulty datasets and the AI models arrive at wrong, biased or otherwise compromised conclusions.

In addition to the datasets, the AI models themselves can be represented as NFTs. To one skilled in the art, the advantages mentioned above regarding representing datasets as NFTs are also relevant for the data models. In addition, such representations for models provides a clear lineage, and version information when the models or the associated weights in the models are updated. It may also be recognized by those skilled in the art that the present invention can work in addition to version control systems, ingesting information from such systems and making it transparent for governance, reporting and audit purposes. Variations of a model may each be represented as a separate NFT. If there is a pipeline process created using data models and datasets, the entire pipeline may be represented as a single NFT, or as a set of nested NFTs, where all the NFTs may be grouped and/or owned and/or bound by the same wallet or a smart wallet. It may be noted that each model itself can also be represented as an NFT with its corresponding metadata. The model NFT can also be a backpack token. This allows for associating any future datasets related to the model to be associated with the model by binding it to the backpack token.

In one embodiment, biometric authentication data is collected, encrypted, hashed and stored on the blockchain in association with private keys for a user wallet. A user's private key can be used to write the biometric hash to the blockchain. When a user attempts to access an NFT or other aspects of the wallet, biometric data is collected prior to release. The user's collected biometric information is verified against the stored information. Once authenticated, wallet transactions can be completed.

In one embodiment, the datasets can be associated with biometric information. By knowing that the datasets have been verified against a known user identity, this can add an extra layer of security to the datasets and to the NFTs that are further associated with those datasets. Users could use their fingerprint or facial recognition to sign transactions or access resources bound to the NFT, providing a secure and convenient way to interact with blockchain applications.

In one embodiment, the datasets can be associated with location information. This location information can also be derived from a variety of sources for example, if the datasets are generated by a 5G device, its location information could be embedded as lat-long information in the data. This can add an extra layer of authenticity to the datasets and to the NFTs that are further associated with those datasets.

Advantageously, location based information and biometrics provide additional security to user wallets.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for creating AI datasets and representing them as NFTs, which may, for example, include location data, or authenticated with biometrics, and includes provenance or ownership information about the data and the datasets themselves. One of ordinary skill in the art will recognize many alternative embodiments (such as other information captured or represented by NFTs) that are not explicitly listed based on the following disclosure.

Figure 1:
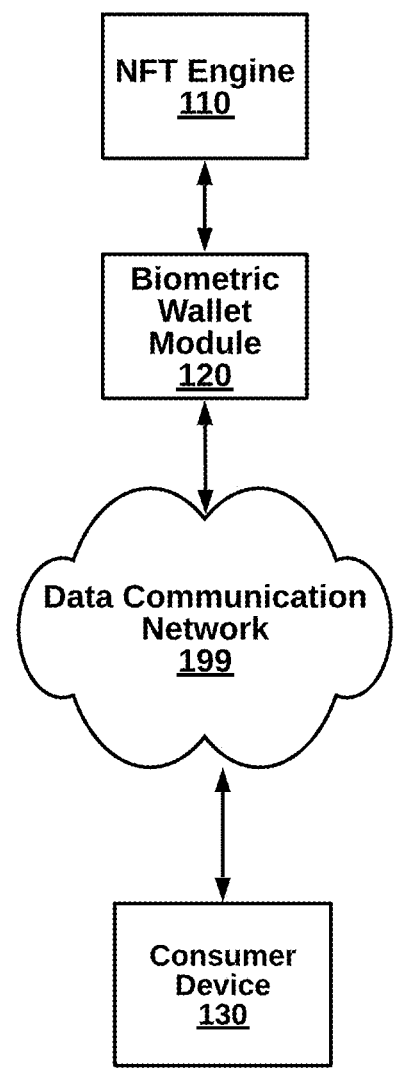
FIG. 1 is a high-level block diagram illustrating a system to protect private keys for crypto wallets with user biometrics, according to an embodiment.
Figure 2:
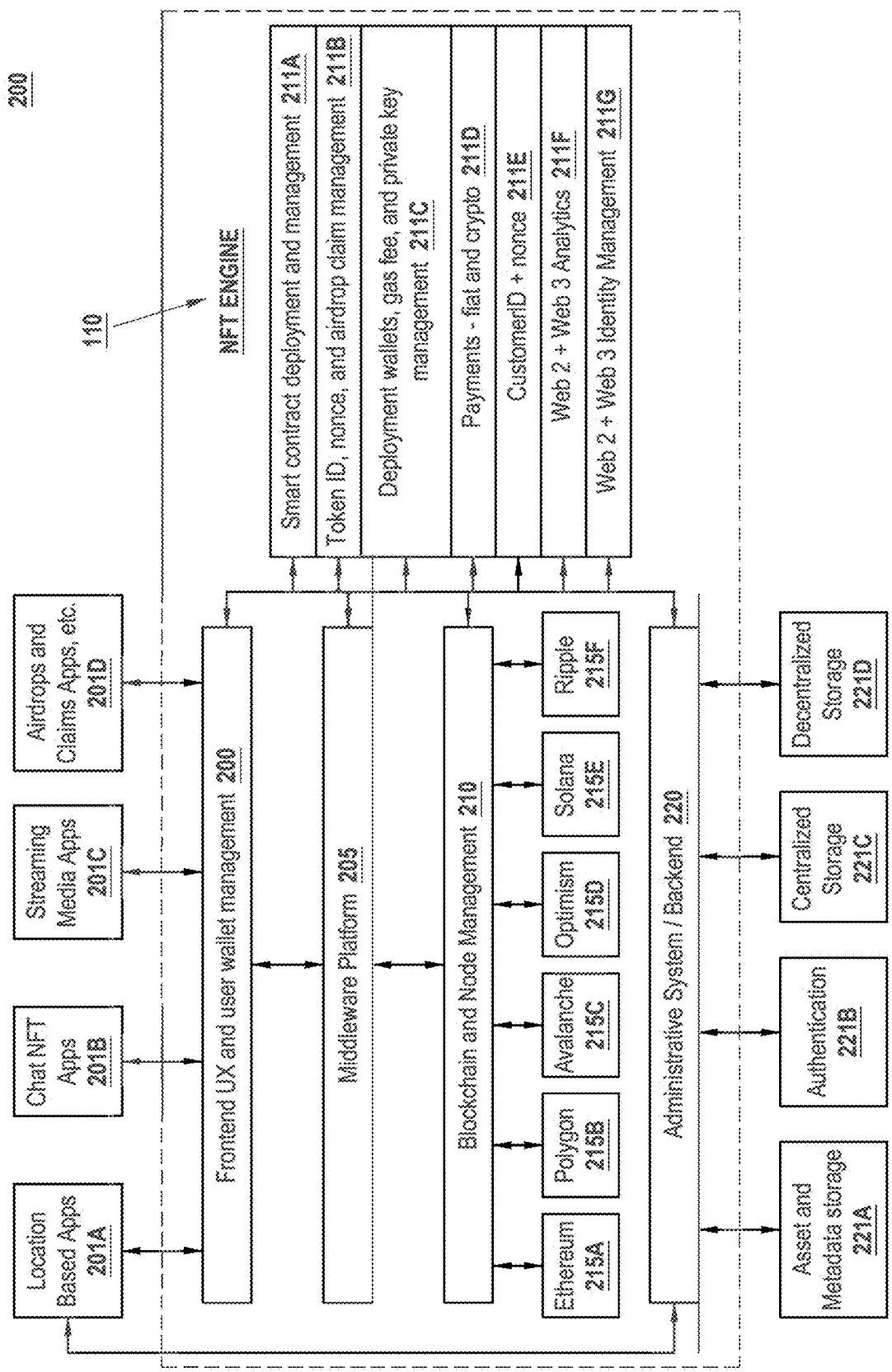
FIG. 2 is a more detailed block diagram illustrating an NFT engine of the system of FIG. 1, according to an embodiment.
Figure 3:
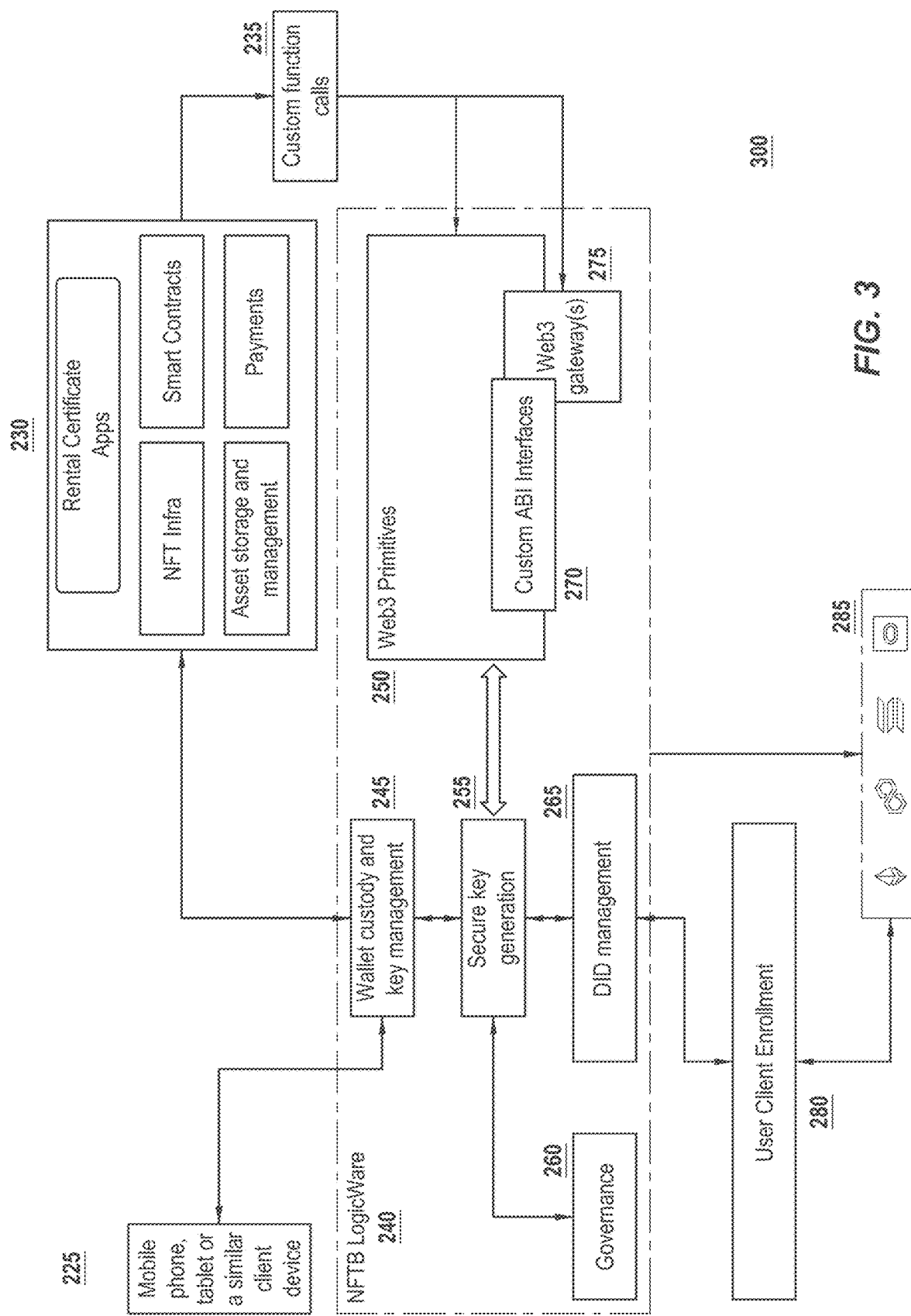
FIG. 3 is a diagram illustrating an AI dataset marketplace or a business application, according to an embodiment.

I. Systems for Security of AI Datasets (FIGS. 1-3)

Crypto wallets store valuable assets for users over digital mediums. Private keys are used to access crypto wallets are vulnerable to hacking and security flaws. The private key is a highly confidential key that authorizes transactions on the blockchain, proving ownership of the associated digital assets. The wallet address is the public counterpart, similar to a public address, that serves as a store of digital assets. Once compromised, contents of the user wallet can be stolen similar to cash being taken from a physical wallet. In accordance with this invention, a user may be an enterprise user who may interact with enterprise infrastructure or business use cases to deploy AI models or train AI models, or a consumer of the deployed AI models, trained with training datasets.

Fungible cryptographic tokens are known. For example, one type of fungible token format is the well-known ERC-20 token. Non-fungible cryptographic tokens (NFTs) are known. For example, one type of NFT format is an ERC-721 token. Both are operable with an Ethereum virtual machine (EVM). While the token formats are known, each token can be configured to create unique functionality, unique expressions, or other unique aspects of the token. An NFT is a cryptographic token that represents ownership or other rights of a designated asset, e.g., a digital file or other assets associated with the token. Typically, the digital file or other asset is referenced in metadata in the token definition.

Token creation (e.g., minting) and transactions are typically handled via "smart contracts" and a blockchain (e.g., the Ethereum blockchain) or other distributed ledger technology. Fungible or non-fungible tokens (NFTs) are minted according to known token minting protocols, but each can be configured with their own parameters to create uniqueness between the tokens. With some tokens, the token may be minted on demand when the token creator decides to mint the token. Some fungible tokens are minted and initially allocated via an initial coin offering. Some tokens are "pre-mined" and subsequently allocated. For example, once minted, an NFT is typically offered for sale or acquisition via an NFT marketplace or other token sale platform.

Prior art tokens are generated or minted solely for the purpose of sale or may be sent to users/consumers in consideration of some action performed by them. The sale process suffers from various technical drawbacks and limitations and is not amenable to be adapted for other purposes such as technical infrastructure for enterprise processes. For example, the minting of NFTs for the specific purpose of wrapping specific data for enterprise systems is not known.

Conventional "smart contracts" have numerous advantages but are limited in that typically they can operate only on the data contained inside the nodes of the blockchain on which they run. They can only access and operate on the data that is already stored on the blockchain itself. They cannot directly interact with or retrieve data from external sources outside the blockchain network. They cannot easily tap into off-chain data sources like web APIs, IoT devices, cloud storage, or enterprise databases. While this makes them a self-contained system, closed to external sources, it can be problematic when external data is needed to satisfy conditions of the smart contract.

FIG. 1 is a high-level block diagram illustrating a system 100 for generating AI datasets and representing them as NFTs on the blockchain. These datasets may be associated with specific AI models or pipelines of workflows created by enterprise or consumers users of applications that utilize them, according to one embodiment. The system 100 includes an NFT engine 110, a smart or a biometric wallet module 120 interacting over a data communication network 199 with a consumer device 130, as users of the system 100, AI infrastructure, AI Foundation, and any AI models, agents, or applications that may be deployed by the enterprise user or consumer. In one embodiment, the NFT engine 110 and a smart or a biometric wallet module 120 are integrated into a single physical device, and in another embodiment, communicate across the data communication network 199. Many other variations are possible.

In one embodiment, NFT engine 110 mints, allocates, or assembles datasets to create tokens based on data or rules-triggered events. NFT engine 110 also may also verify an NFT and provide access to AI datasets and any other such content gated by the NFTs, in response to a user satisfying specified token criteria.

The NFTs can also be minted in accordance with other observance, auditing, governance, transparency, operational or marketing objectives-such as, as part of an enterprise user or a consumer profile and the user's interaction with the AI training model, training data set, or an AI application, for example, an NFT can be minted when the user verifies certain data as authentic and satisfies the AI model requirements. In another embodiment, an NFT can be minted at a predetermined time interval, when the data collection efforts for that period may be complete, for example, when all data from a sensor has been collected on a weekly, monthly, or a quarterly basis etc. In another embodiment, an NFT for a series of data can be minted if all the users of a group, working collaboratively towards a model, signal that the dataset for a model is complete. For example, a time-series of data can be curated as a dataset representing the data collected over a period of time. With provenance of such data recorded additionally on a blockchain, anyone interested in using the dataset can verify it. In yet another embodiment, the NFT can be minted if the data providers or consumers are members of a DAO (decentralized autonomous organization). Other ways of minting the tokens include but are not limited to:

a. The datasets and the AI applications can be embedded into other applications such as games. User data can be aggregated within a gaming environment and data generators can be rewarded if their data is included in any of the datasets. Groups of players can also be similarly rewarded if they collectively contribute to the data in datasets via the gaming application.

b. The datasets and AI application can be a part of a productivity suite of software, natural language processing application, computer vision software, speech recognition software, robotics hardware or software, machine learning applications etc. The NFTs can be minted in accordance with corporate policies on data gathering, usage, monetization, and rewards to the data creators or group of data creators.

c. The AI datasets and applications can be part of a retail, ecommerce, data marketplace or any other web application. The NFTs can then be minted in accordance with the platform, or for any other marketing, tracking, or operational objectives. For example, users can verify, authenticate their own datasets, associate them with NFTs, and list them on the marketplace. Buyers looking for such datasets will be able to browse the marketplace, filter the available datasets based on the metadata, and pay for the datasets on the marketplace, before getting access to them. Once buyers gain access, their access duration and terms can be controlled via smart contracts. In one embodiment, when buyers pay for such datasets, the proceeds can be split up amongst the various contributors to the dataset, in accordance with their data ownership and governance mediated via smart contracts.

d. For a standalone dataset and AI application the NFT minting can be based on the user's personal credentials (phone number or email address) and attested to by their professional credentials (for example, Professor of Computer Vision, Stanford) or their peers. Attestation can additionally be recorded on a blockchain.

e. Datasets or sources could also be from one or more devices, for example, in the form of machine language (ML) data. The NFT could represent that the data came from a verifiable, reputable or trustworthy device or input source.

f. Data models can be of the form of a parent NFT. Datasets can be of the form of child NFTs that are owned by the parent NFTs themselves. In this way, the NFT itself serves as a wallet to hold other NFTs. In one embodiment, a data model NFT could serve as a wallet to own the dataset NFTs that it was trained upon. In this way these data models and datasets can all be analyzed together.

g. Data models and datasets can be minted as NFTs in accordance with the ERC721, ERC1155, ERC998, ERC6551, ERC4337 or any other protocol token minting protocol or its equivalent.

h. Datasets can be of the form of logs as described above. These logs may be created as new infrastructure is deployed in the enterprise cloud or on-prem applications. There may be other information that may be appended to these logs in the form of json, csv, or any other data type including pictures, video, and multimedia content etc.

The NFTs can also be minted in accordance with other operational or marketing objectives, for example as part of a customer collaboration, or as a membership in a DAO (decentralized autonomous organization). In one embodiment, a telecom company can provide datasets such as for call detail records (CDRs), network traffic, customer usage, network infrastructure etc. This data can be used by a video streaming company to train and optimize the delivery of their video streams based on location, time of day, etc. A location triggered module can optionally be integrated. Other ways of minting the AI datasets as NFTs include but are not limited to:

a. Source data that includes all the sources of data that are needed to create the dataset. This could be a raw dataset. These sources could include public datasets, web scraping, APIs, or other sources. Any datasets that are minted as NFTs can be bound to the same wallet address or the same smart contract representing a collection of datasets.
b. Processed data that has been analyzed or verified to make it suitable for particular AI applications. This data processing could involve cleaning, transforming or otherwise formatting the data to make it consistent and ready for analysis and may optionally be tied to a physical location or device.
c. Labeled data that has been labeled with appropriate tags to make it useful for AI applications. For example, images may be labeled with object classes, or label text with sentiment or topic categories. These can be created by the external users, hired employees of an organization, or crowdsourced as user generated content etc. or they may be created from the official content from certain triggers in physical or digital worlds.
d. If the datasets are split into training, validation, and test sets, each set can be minted in itself as a separate NFT. This is important for evaluating the performance of AI models and avoiding overfitting. For instance, NFTs can represent or indicate separate training datasets (or versions); if a particular training set is later found to be corrupted, unverified, untrustworthy or otherwise deemed to be unincluded (or included), the AI can be retrained using only good or acceptable data sets. These datasets can then be bound to a particular user identity, a particular wallet, or a smart contract on the blockchain.
e. AI models and datasets need to be updated regularly to ensure they remain relevant and useful for AI applications. Alternately, older versions of the AI models can be trained and retrained on newer datasets until a fitting response is obtained. The updates may involve adding new data or updating labels and other information based on feedback from users. NFTs representing these datasets can also be periodically updated as dynamic NFTs, or they can be composed as new NFTs along with the older datasets attached to them for transparency purposes. This update can be done using ERC998, ERC6551, ERC4337, or any other relevant NFT standards or any other similar standards or acceptable frameworks on updating datasets.

As discussed above, datasets can be attested. Such attestation can be optionally recorded on a blockchain. Such attestation enables users to verify and attest to real-world information and data on the blockchain. It allows for the creation of secure, privacy-preserving attestations that can be used for various purposes, such as identity verification, credential issuance, and data authentication. By leveraging attestations on a blockchain, organizations and individuals can establish trust and transparency in the verification process, as the attestations are recorded in an immutable and tamper-proof manner. This can have significant implications for sectors like finance, healthcare, and education, where reliable attestations of identities, credentials, and data are crucial.

These attestations can simply be implemented using the Logicware platform that provides a combination of smart contracts, and off-chain data storage.

1. Off-Chain Data Storage: The actual sensitive datasets or documents that need to be attested (e.g., AI models or training datasets, weights, identity documents, credentials, or records etc.) are stored off-chain in a secure storage facility such as a cloud environment or a decentralized storage such as IPFS.
2. Hashing and Encryption: The off-chain data is hashed using cryptographic hash functions, and the resulting hash is encrypted using the public key of the attesting entity (e.g., an enterprise user who wants to submit the attestation).
3. Smart Contracts: A set of smart contracts deployed via the Logicware manage the attestation process. These contracts handle tasks such as:
   Registering and authorizing attesting entities
   Storing and verifying encrypted hashes of attested AI datasets or AI models
   Issuing and revoking attestations
   In addition, the Logicware platform provides APIs for attestation verification.
4. Attestation Issuance: When an entity wants to attest to a piece of data or document, they encrypt the hash of the datasets or the AI models using their private key and submit it to the smart contracts. The contracts record the attested hash on the blockchain, along with metadata about the attesting entity and the attestation type.
5. Attestation Verification: To verify an attestation, the interested party (e.g., a service provider or another entity) can use the Logicware APIs to query the smart contracts, providing the encrypted hash and attestation metadata. The smart contracts can then confirm if the attestation exists and is valid, without revealing the actual underlying data, AI datasets or AI models.
6. Data Retrieval: If the attestation is valid, the interested party can retrieve the encrypted hash from the blockchain and use the attesting entity's public key to decrypt it. They can then compare this hash against the hash of the AI datasets or AI models they have, confirming its authenticity and integrity. By leveraging smart contracts, cryptographic hashing, and off-chain data storage, Logicware platform enables secure and privacy-preserving attestations on the blockchain.

Documentation of the AI datasets as detailed above such as providing information on the data sources, preprocessing steps, labeling, and any other relevant details can be stored as metadata information for the NFT itself. This can help anyone accessing the datasets to understand and use the dataset in their own AI applications and to classify them properly in marketplace applications. As these datasets may be shared with others, access control lists can be created that may be directly controlled by the smart contracts. Also, the transfer of such NFTs can be mediated via smart contracts or other third party rules that need to be satisfied. This is particularly important when audit and transparency requirements may need to be satisfied. The NFTs may be transferred to the auditors for the period of the audit. A longitudinal timeline view of provenance can be easily established by analyzing the data and metadata associated with the NFTs.

The NFT platform disclosed in the embodiments takes the complexity of the blockchain environment and abstracts it into a set of APIs and SDKs that can manage the entire process easily. For example, crypto wallets are front end technologies that require user interaction and input to mint an NFT from a smart contract. The NFT minting platform has turned it around and made it into a backend and middleware technology (called Logicware), by managing the complexity away from the user and providing for interaction via APIs and SDKs. As such any front end application can now interact with the blockchain without burdening the users with the intricacies of storing or managing their private keys and authorizing transactions to sign transactions to interact with the blockchains and mint, redeem, or create NFTs. A proxy process can be deployed in the backend that abstracts the user signatures as part of the transaction. At the backend, the transactions can also be handled by custodial wallets, smart wallets, or multi-signature wallets that can associate the transactions to the user accounts. The backend is capable of supporting multiple applications simultaneously and while each application may be deployed by a unique customer. The NFT engine 110 maps the backend databases, digital assets, and the blockchain layer interaction to provide a simple workflow for businesses and enterprises.

It may be noted that the LogicWare also provides for creating wallets with various ways of protecting the private keys. The private keys can be stored on a Hardware Security Module (HSM), or in Key Management Systems (KMS), whose keys may be further entrusted to an encrypted vault. The keys can also be managed using a multi party computation (MPC) process that enables multiple parties to jointly compute a function without revealing their private inputs to each other. As part of the key management contemplated by this invention, LogicWare can distribute the private key across multiple parties in a way that ensures that no single party has access to the full private key. Instead, each party holds a share of the private key, and only by combining all shares can the full private key be reconstructed. Finally, irrespective of the key security mechanism described above, if at any time, a holder of the private key so desires, they can take complete control of their private keys via LogicWare.

For users of such a system, it is important that the system should be easy to use and also provide for secure authentication. It is also important that the system not allow for deconstruction of personal identities based on the actual datasets. As such, authentication plays an important role. An authentication module can optionally store login information and authenticate users against the blockchain information. As detailed below, the system can deploy decentralized IDs to enable selective disclosure of information or identity attributes. A user's public key may be stored on the blockchain which allows anyone to verify the authenticity of messages, transactions, or other data associated with that identity. A user in the ecosystem (for eg., dataset creator, or dataset buyer or seller) may store identity-related data on the blockchain, such as verifiable claims, which are claims that have been cryptographically signed by a them and can be verified by others without revealing any additional information about the identity. Also, Zero knowledge proofs can be implemented to ensure that information about a user can be verified without sharing any personally identifiable information or protected information. Finally, verified credentials can also be deployed to ensure trustworthiness of the system.

A verified credential as part of this invention is a digital representation of a piece of identity-related data that has been cryptographically signed by a trusted authority. These credentials can include things like a person's name, business name, or business application, business registration details, or any other information as defined above relevant to the generation or utility of the AI datasets. In a DID system, verified credentials are used to help establish trust between different parties. For example, when a user wants to prove their identity to a service provider (e.g., data aggregator, model builder, end application), users can present a verified credential that has been issued by a trusted authority such as an insurance company, a government agency or any other trusted participant in the ecosystem. The service provider can then cryptographically verify the authenticity of the credential without having to rely on a centralized identity provider. These verified credentials can be stored on the blockchain, along with the decentralized identity and associated public keys. This allows them to be accessed and verified by anyone in the network without the need for a centralized intermediary. Additionally, because the credentials are cryptographically signed, they cannot be tampered with or altered without detection. Overall, verified credentials help to provide a more secure, private, and flexible approach to identity management, enabling individuals and organizations to assert and control their identities without relying on centralized intermediaries.

The NFT engine 110 offers a wide range of features designed to enhance user interaction and accessibility. It allows location information to be associated with data and datasets, sourced from various devices. Users can access the system via web applications, dedicated NFT marketplaces, or any supported embedded app within a website, native mobile app, or a 3D metaverse environment powered by gaming engines like Unity or Unreal. Optionally, geofences can be configured around various locations such as businesses, office parks, research facilities, retail venues, or event spaces, ensuring interaction is limited to participants within specific physical locations.

When location services are enabled, users entering the geofenced area can seamlessly interact with the application. The LogicWare 600, along with APIs and SDKs, allows for the development of applications in various forms, including single web apps, native mobile apps, or monolithic client applications.

The application can be triggered by various events or actions such as scanning a QR code, accessing a specific URL, being automatically configured in the backend, sent as an SMS or message, or initiated by the scan of a user's biometric information. Additionally, single sign-on (SSO) or a SAML assertion within an application can initiate access.

Users can register or initiate using email, any social network, single sign-on (SSO), or a SAML assertion. They can associate their login details with a wallet address on a blockchain (derived from a public key) and store a corresponding private key. The private key is a highly confidential key that authorizes transactions on the blockchain, proving ownership of the associated digital assets. The wallet address is the public counterpart, similar to a public address, that serves as a store of digital assets. Optionally, the application can create a decentralized identity wallet for the user, with verified credentials mapped to the user's biometric information, ensuring privacy and security.

Users can claim a digital asset via presenting the public key to the application configured with a smart contract. The asset can be redeemed for a code or purchased with an embedded payment mechanism in fiat or cryptocurrency. Whitelisted wallet addresses may be allowed to mint an asset, whereas blacklisted wallet addresses may not be allowed to interact with or are blocked by the application.

The application is governed by smart contracts, which can be EVM compatible or custom developed for specific blockchains such as Near or Solana. These smart contracts allow for various types of digital assets, including unique digital assets (ERC 721), copies of unique digital assets (ERC 1155), mix and match of various other digital assets (ERC998), and semi-fungible tokens (ERC3525). They also allow for the rental of digital assets, with assets created via the smart contract importable within a metaverse environment or a 3D environment powered by any gaming engine.

The NFT engine 110, in an embodiment, mints and allocates cryptographic experiential tokens based on a location-based event and entitling the user to access an experience. In another aspect, token-gated access is granted to a resource at a location based on location triggered events and providing access to token-gated content in response to a user satisfying specified token criteria.

The system 100 may employ computer code modules (e.g., smart contracts) configured to manage the assignment of the non-fungible cryptographic tokens to designated digital wallet addresses associated with corresponding owners of the non-fungible cryptographic tokens. Digital wallets, or e-wallets or cryptocurrency wallets, can be in the form of physical devices such as smart phones or other electronic devices executing an application or electronic services, online services, or software platforms. Devices serving as digital wallets may include location-based services capabilities, e.g., GPS, UWB, BLE, NFC, Wifi, NFC, etc. and/or other capabilities. Digital wallets may provide a store of value or a credit or access to credit and may be in the form of a digital currency or involve a conversion to digital currency, tradeable digital asset, or other medium of exchange. The stored value accessible using a digital wallet may involve authentication to access ownership records or other indicia stored in a digital ledger or DLT and requiring authentication and/or other decryption techniques to access the store of value. Parties may use digital wallets in conducting electronic financial transactions including exchanges of digital currency for goods and/or services or other considerations or items of value. Transactions may involve use of merchant or other terminal equipment and involve near field communication (NFC) features or other communication techniques and use a computer network. In addition, digital wallets may include identifying or authenticating information such as account credentials, loyalty card/account data, and driver's license information, and medical IDs, and the transaction may involve communicating information contained or stored in the digital wallet necessary to complete intended transactions.

A. Smart or a Biometric Wallet Security

An optional smart or a biometric wallet module 120, of one embodiment, associates biometrics with users wallets and uses biometrics to retrieve private keys to execute transactions on a user's behalf. The smart or a biometric wallet module 120 is further described in FIG. 3 where the wallet module 120 is supported by additional modules 310-340. The biometric authentication module 310 registers biometric data for one or more users and, in turn, verifies biometric data when wallet access is requested. A key module 320 manages keys for user wallets. An NFT processing module 330 interacts on a back end with the NFT engine 110 in a manner that can be transparent to users, for example, to store user wallets. A network module 340 uses Ethernet, cellular, or other protocols for channel communication through the data communication network 199 to communicate with a consumer device 130.

Additionally, AI agents can be used to facilitate automated data reporting service processes that may interact with any of the modules.

AI agents are software programs that employ artificial intelligence techniques to operate autonomously or semi-autonomously in a variety of environments, making decisions based on input data, predefined rules, machine learning models, or a combination of these methodologies. Typically, AI agents are capable of performing tasks independently without human intervention, adjusting their actions based on the analysis of incoming data. In this way they are an extension of an analytics engine and make it easy to take actions based on the underlying analysis for the data that they operate upon, such as performance or other informational data. These agents can improve their performance over time through learning mechanisms, based on the data itself. They adapt by observing outcomes and integrating new knowledge into their decision-making processes, retraining their algorithms in light of the new data. AI agents continuously perceive their environment and can react to changes in real-time or near real-time. Beyond reactive behaviors, AI agents can also exhibit goal-oriented behaviors, initiating actions based on predictive analytics and strategic planning. The design allows these agents to handle increasing amounts of work or to be easily expanded to manage complex or additional tasks. The output of AI agents can be information that can be represented as metadata and associated with an NFT. In one embodiment AI agents can be used to process data and create metadata that can be immutably recorded and attached to an NFT.

These AI agents can be implemented using a variety of technical frameworks and methodologies, including but not limited to:

Machine Learning and Deep Learning: Utilizing algorithms and neural networks to analyze data, recognize patterns, and make decisions.

Natural Language Processing (NLP): Enabling the understanding and generation of human language, facilitating interactions between humans and machines.

Robotics: Applying AI in mechanical or virtual robots, connected devices, IoT (Internet of Things) devices, etc. allowing for physical interaction with environments.

Expert Systems: Incorporating rule-based systems that mimic the decision-making abilities of a human expert.

Data Analysis Systems: Designed to interpret vast datasets efficiently and accurately to derive meaningful insights.

Biometric information, such as fingerprints, facial recognition, and iris scans, can be used to protect private keys, which are used to access and secure cryptocurrency wallets and other sensitive information. Protecting private keys helps to secure the NFTs and digital assets that may be associated with the digital wallet. By requiring biometric authentication, users can ensure that only authorized individuals are able to access their private keys and that the keys are protected from unauthorized access or theft. The biometric information can be converted into a mnemonic and used to encrypt and decrypt the private keys as well.

To use biometric information to protect private keys, the platform can set up a biometric authentication system that requires users to provide a valid biometric identifier, such as a fingerprint or facial scan, in order to access their private keys. This system can be integrated into the user's wallet or other sensitive information, and can be configured to require biometric authentication each time the user attempts to access their keys. Biometric data or its signature is hashed and may be stored in a storage location, such as on the user's device.

Additionally, users can also use biometric authentication to secure their private keys in other ways. For example, they can use biometric information to encrypt their private keys, so that the keys can only be decrypted and accessed with a valid biometric identifier. This is important for securing transactions as transactions need to be signed by a valid set of private keys. Storing private keys encrypted with biometric information is a safer way of securing the private keys and is a preferred embodiment. In addition, the system can also use biometric authentication to create multiple layers of security for their private keys, such as requiring a combination of a password and a biometric identifier.

Overall, using biometric information to protect private keys can provide an additional layer of security for users, and can help to prevent unauthorized access or theft of their cryptocurrency wallets and other sensitive information.

B. AI Applications And Preserving Training Data Sets

Furthermore, AI applications need preservation from hacking. To preserve AI training data sets from hacking, businesses and organizations can implement a variety of security measures and best practices. Some potential strategies for protecting AI training data sets from hacking include:

Encrypting the data: Encrypting the data using strong encryption algorithms can help to prevent unauthorized access to the data, even if it is intercepted by a hacker.

Storing the data securely: Storing the data in a secure location, such as a secure server or cloud-based storage system, can help to protect the data from physical tampering or theft.

Implementing access controls: Implementing access controls, such as user authentication and permission-based access, can help to limit who can access the data and what actions they can perform on it.

Monitoring and detecting anomalies: Monitoring the data and the systems that store and access it for anomalies or suspicious activity can help to detect potential hacking attempts and respond to them quickly.

One unique way of implementing this is via converting the training data sets as NFTs or digital assets protected by strong encryption techniques afforded by blockchain. In addition, data on a blockchain is immutable and an on-chain storage of encrypted training data sets will ensure that the data cannot be tampered with. Another advantage of converting these data sets to NFTs is that access controls and encryption can be handled together as one data package rather than as multiple connected systems.

AI agents can be used to facilitate automated data reporting service processes that may interact with the modules 310-340. Such automated data reporting service processes may include:

1. Database services designed to manage, query, and report data from relational, non-relational, or vectorized databases efficiently.

2. Business intelligence tools that collect and process large amounts of unstructured data from internal and external systems, prepare it for analysis, develop queries against that data, and create reports, dashboards, and data visualizations.

3. Data Warehousing Solutions that aggregate data from multiple sources, making it easier to provide comprehensive reporting and analysis. They often include tools for automated reporting and data analysis.

4. AI powered analytics platforms that use artificial intelligence to analyze data and generate reports. They can identify patterns, trends, and anomalies without human intervention.

5. AI agents that meet specific business needs, capable of extracting data from various sources, analyzing it using machine learning models, and generating tailored reports. These agents can be trained to provide insights specific to the business's operational, tactical, or strategic queries.

These automated data processing reporting services may also include spreadsheet tools with automation features, API based tools, cloud based reporting services, ETL (extract, transform, load) tools or any combination of the above.

The NFT Engine 110 interfaces with a variety of other software modules including the user experience modules and the core software infrastructure modules. In one embodiment, 201A is a location based application that is built using the NFT Engine 110. Location based apps 201A could also be a non location based application or any other generic application that provides blockchain and NFT functionality to the users. smart or a biometric wallet apps 201B is another application or module. Other applications from a user experience perspective may be streaming media or digital avatar apps such as 201C or AirDrop and claims applications such as 201D there may be many more applications that can be built on top of the NFT engine. These applications interface directly with the NFT engine via the front end UX and user wallet management modules 200. In addition these applications also interface with an administrative system or a backend, 220, which may be specific or customized for each application. The front end UX and user wallet management module 200 is connected to the NFT brewery middleware platform, 205, which in turn connects to blockchain and node management modules 210. It may be noted that all the components of the NFT engine may also be directly interconnected with each other to ensure proper data flow, data and identity management and access controls for the users. The administrative system or backend 220 connects to various blockchains including but not limited to Ethereum (215A), Polygon (215B), Avalanche (215C), Optimism (215D), Solana (215E), Ripple (215F), or any other EVM or non-EVM blockchain via custom RPCs and APIs. In addition the back end 220 provides support for asset and metadata storage (221A), authentication (221B), centralized storage (221C), or decentralized storage (221D). Other modules and components of the NFTEngine include:

1. Smart contract deployment and management module (211A), that supports any underlying blockchain 2. TokenID, nonce, airdrop claim management modules (211B) to ensure individual transactions can be processed out of sequence as well in case certain transactions are held up in the execution queue.

3. Deployment wallets and scripts, wallet management including private key management and gas management (211C), with a variety of ways for managing private keys including encryption, utilizing key vaults, multi party computation techniques (MPC) or multi-signature wallet management.

4. Payments modules for both fiat as well as cryptocurrencies (211D) via payment gateways, integrating recording the transaction results and status directly into the blockchain.

5. CustomerID and Nonce management for individual customers (211E), similar to user side described above, to ensure that transactions by different customers do not queue up and can be processed independently.

6. Integrated web2 and web3 analytics (211F) to map transactional information of users to their wallets. In addition, AI techniques and algorithms can be utilized to infer behavioral information about users independent of their demographic information.

7. Integrated web2 and web3 identity management (211G) that allows for access controls to be implemented based on the digital wallets, ownership of media or avatars, or any other digital goods or identity modules including SSO, SAML, etc.

Web3 represents a shift towards a more decentralized, transparent, and user-centric internet, where individuals have greater control over their online interactions and data. Web3 refers to a next generation of the internet, where decentralized networks, blockchain technology, and cryptocurrencies are integrated to create a more open, secure, and user-centric internet. Unlike Web 2.0, which is characterized by centralized platforms and services controlled by large corporations, Web3 aims to decentralize the internet, giving users more control over their data and online interactions.

In Web3, users interact with decentralized applications (dApps) that run on blockchain networks, such as Ethereum, and communicate through peer-to-peer protocols. This enables trustless transactions, where intermediaries are eliminated, and transparency is ensured through the immutability of blockchain technology.

One of the key features of Web3 is the use of smart contracts, which are self-executing contracts with the terms of the agreement directly written into code. Smart contracts enable automated and tamper-proof agreements, facilitating various applications such as decentralized finance (DeFi), non-fungible tokens (NFTs), decentralized exchanges (DEXs), etc. Smart contracts may also be bound to NFTs to create smart wallets.

Immutable refers to the inability to modify or tamper with data once it has been recorded. Transactions and data recorded on a blockchain are immutable, which means that they cannot be altered or deleted retroactively. This immutability is achieved through cryptographic hashing and the decentralized consensus mechanisms employed by blockchain networks. The immutable nature of blockchains ensures data integrity, transparency, and an auditable trail of all activities, which is crucial for applications requiring tamper-resistant record-keeping and trustless interactions. Data can also be stored immutably over the InterPlanetary File System (IPFS), which uses content-addressing to store immutable data in a distributed file system. This complements the immutable data storage capabilities of blockchains. Data can be stored on IPFS instead of directly on a blockchain due to the significant storage constraints and costs associated with recording large amounts of data on most blockchain networks. By storing the data immutably on IPFS and recording just the content-addressed IPFS hash on the blockchain, applications can leverage the immutability and tamper-resistance of both systems while optimizing for efficient data storage.

Ingesting data is the process of importing assorted data files from one or more sources into a cloud-based or on-premise storage medium, a data warehouse, data mart, InterPlanetary File System (IPFS), decentralized storage network, or any other structured or unstructured database where it can be accessed and analyzed. This process involves extracting data from various sources, transforming it into a compatible format, and loading it into the designated storage or a processing system. Efficient data ingestion mechanisms are crucial for handling large volumes of data from multiple sources in real-time or batch modes. The ingested data can encompass various formats, including text, numerical data, audio, video, and multimedia content. The ingested data can originate from databases, log files, IoT devices, social media platforms, or any other data-generating source, enabling organizations to consolidate and derive insights from diverse data sets. Robust data ingestion pipelines ensure data integrity, scalability, and integration with downstream analytics and processing systems.

A backpack is a cryptographic construct that binds a user's digital identity, data, credentials, or any other digital assets to a non-fungible token (NFT) or other blockchain-based token. This account backpack NFT serves as a secure, portable representation of the user's identity, data, credentials, and other assets across different applications. By leveraging the immutability and trustless characteristics of blockchain technology, the account backpack provides users with self-sovereign control and management of their digital identity and assets within a unified repository while maintaining security, transparency, and an auditable record of account activity.

Binding refers to the cryptographic process of associating a user's digital identity, credentials, assets, or data with a specific blockchain token or non-fungible token (NFT). This binding establishes an inseparable link between the token and the account, ensuring that the account's contents are inextricably tied to the token's ownership and transfer. The binding mechanism leverages cryptographic primitives like digital signatures and hashing to create a secure and verifiable connection between the account data and the fungible or non-fungible tokens. Once bound, the account and its associated data can only be accessed, modified, or transferred by the rightful owner of the corresponding token, as established by the private key/wallet address pair, providing self-sovereign control over the digital assets, identity and credentials.

A series of NFTs may refer to a chronological sequence of recorded activities, actions, or occurrences. Each NFT that is created in the series may be appended as an immutable entry, preserving the order and integrity of the overall series. The series of NFTs therefore allows for a transparent and auditable log of all events that have transpired within a system or process. As such, the system ensures a verifiable history that cannot be retroactively modified, enabling trustworthy record-keeping and traceability of operational activities over time.

An interval represents a specific, finite period or window of time that is consumed or utilized in its entirety. An interval has a defined start and end point. Once an interval has been allocated or assigned for a particular purpose, it cannot be reused or reassigned until it has been fully consumed or expired. This property of intervals ensures exclusivity and prevents overlapping usage conflicts within the designated time window. For example, if data from a particular interval has been converted to an NFT for audit purposes, the same data may not be included in another interval for a second NFT, as it may lead to double counting of the resources utilized in the interval. Such double counting can lead to conflicts and destroy the integrity of the data.

The end user may log in into the platform using a mobile phone tablet or similar client device (225). The application running on the device interacts with the NFT middleware platform via the NFTB LogicWare (240). The LogicWare determines the wallet custody and key management protocol 245 that applies to the particular application (230) or the user and logs the user in into the application. If the user interacts with the application or dApp the first time, the custody and key management protocol 245 generates a new key pair using the secure key generation module 255 or the user and associates it with their identity. Optionally it may also associate the keys with a decentralized identity and issue verified credentials to the user. Additionally, LogicWare also creates or associates the governance policies that the user identity may be subject to. If the user is a returning user, the LogicWare retrieves the keys and based on the governance and access control rights, allows the user to access the application or the dApp. As depicted in FIG. 2 the application or dApp may consist of several components including smart contracts deployed via the module 211A or otherwise imported into the application, NFT infrastructure modules such as 211A, 211B, 211C, 211D, 211E, 211F, 211G, asset storage and management (221A, 221C, 221D), or payments 211D.

The application interfaces with the middleware and NFT engine via custom function calls APIs and SDK's 235. The NFT engine includes various web3 primitives, 250, that are interoperable building blocks that are highly reliable in executing transactions over a blockchain, communicate with backend 220 and frontend 200 systems, work with storage components 221C, 221D, utilize analytics from modules such as web2 and web3 analytics 211F, identify users using the identity management module 211G, secure the applications using authentication, identity management, or implement access controls with 211G, 211B or provide for a governance layer in combination with the governance module 260. The web3 primitives 250 also communicate with custom ABI interfaces 270 and web3 gateways 275 for deploying smart contracts to their respective blockchains, interacting with smart contracts, and executing the functions and instructions in the smart contracts.

In addition, the LogicWare optionally comprises a governance 260 and a Decentralized Identity (DID) management module 265. DIDs are an important part of securing identity and making it interoperable across both web2 and web3 platforms.

Applications in web3 are also referred to as dApps. Governance in decentralized applications (dApps) in and communities refers to the processes and mechanisms through which decisions are made and actions are taken within the decentralized ecosystem. In traditional centralized systems, governance is typically controlled by a central authority, whereas in decentralized systems, governance is distributed among network participants. In one embodiment, the decision making and governance is in part based on the decentralized identity of the users themselves, who interact with the dApp and the associated smart contracts with their wallets and their corresponding private keys. The Governance module 260 within the NFTB LogicWare allows for implementing various governance mechanisms and resource allocations. In conjunction with the DID management module 265, the governance module 260 also employs mechanisms to prevent Sybil attacks or other malicious attacks on the system, such as, where an individual may create multiple identities to gain disproportionate influence for voting purposes. Sybil resistance mechanisms can include reputation systems, stake-weighted voting, or identity verification to ensure that governance decisions are made by genuine participants.

The DID management module 265 is a part of the web2 and web3 identity management module 211G described above. The module utilizes methods for decentralized technologies, such as distributed ledgers (e.g., blockchain) or peer-to-peer networks, to enable the creation, management, and verification of DIDs and associated digital identities. As such, the DID created for any user can be used as an identity across any blockchain and helps identify the user on the application, without compromising the user's actual identity or demographic information. The users retain full control over their DID and can choose to lock and selectively share their information using their DIDs. In particular, this is an efficient way of combining various private blockchain systems favored by enterprises, with the public blockchain systems. With a DID, a user can retain the same wallet address to make transactions over any supported blockchain.

Various blockchains may have different ways to monitor and govern the identity of the users. In order to map the identity from one system to another, it may be necessary to homogenize the identity across the multiple platforms by implementing a client enrollment module, 280, to create a system where the identities from one system may map directly to an identity on another system, without the need for any user intervention. For example, when making a private blockchain system to be compatible with a public blockchain such as Ethereum, Polygon or Solana, it may be essential to create a user (client) enrolment into the Hyperledger based system and map it to the private keys for the eventual user of the system.

Figure 4:
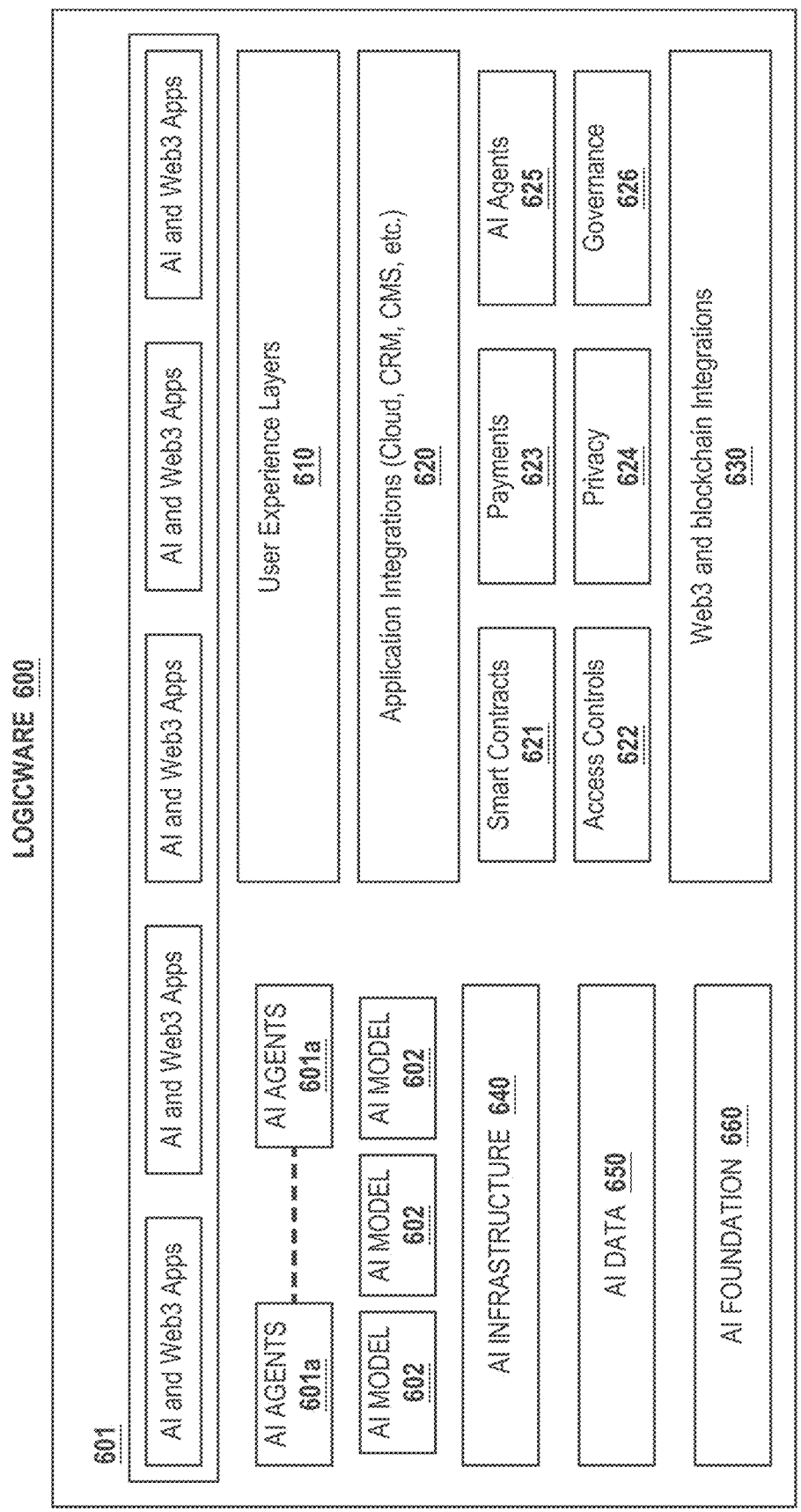
FIG. 4 is a block diagram illustrating the elements of the LogicWare with artificial intelligence, blockchain and Web3 interfaces, according to an embodiment.
Figure 5:
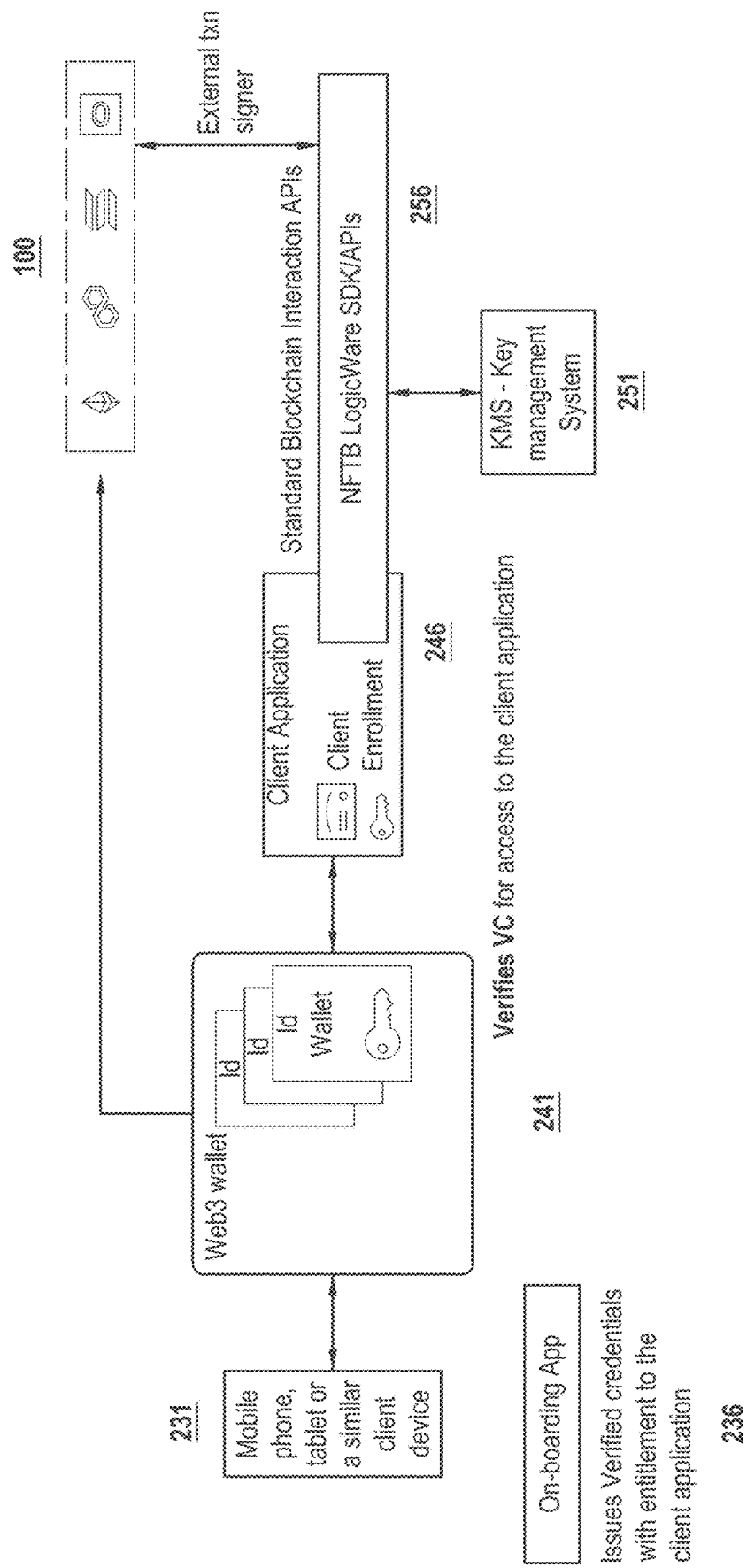
FIG. 5 illustrates the use of verified credentials (VCs) for authentication into the ecosystem of applications for access control or user onboarding features, according to an embodiment.

FIG. 4 illustrates the use of verified credentials (VCs) for authentication into the ecosystem of applications for access control or user onboarding features.

When a user logs in to the platform using a mobile phone, tablet, desktop, or a similar device, 231, the onboarding application 236 or dApp issues a verified credential (VC) to the user. It may be noted that the VC may be issued by a third party application separately and imported into the client application. These VCs allow the user to access other connected applications or dApps that the user may wish to, such as loyalty programs, using their decentralized identity. As such verified credentials (VCs) act as authenticating mechanisms for users to use the appropriate wallets as a proxy for their identity on the system. A user may have multiple wallets associated with their identity. When a user logs in to the application or dApp, the LogicWare 256 identifies the appropriate identity to use and retrieves the appropriate keys from the key management system, 251. This in turn allows the application or dApp 246 to transact with the blockchain using the appropriate identity and the private keys associated with them. A user's public key may be stored on the blockchain which allows anyone to verify the authenticity of messages, transactions, or other data associated with that identity.

Automated data reporting service processes such as artificial intelligence agents (or AI agents) are software programs or algorithms designed to perform specific tasks autonomously, making decisions and taking actions based on predefined rules, learning from data, or adapting through machine learning techniques. AI agents can leverage data, including data associated with NFTs, to perform various tasks and processes. AI agents are used in various applications across different domains, including:

Virtual Assistants: AI agents like Siri, Alexa, and Google Assistant interact with users, understand natural language, and perform tasks such as answering questions, setting reminders, and controlling smart home devices.

Chatbots: AI agents used in customer service and support systems to interact with users, answer questions, provide assistance, and handle simple tasks.

Recommendation Systems: AI agents analyze user behavior and preferences to provide personalized recommendations for products, movies, music, and content.

AI agents can be simple or complex, depending on the task they are designed to perform. They can also range from rule-based systems to advanced machine learning models capable of learning from data and improving their performance over time AI agents can perform a wide range of tasks across various domains, including:

Natural Language Processing (NLP): AI agents can translate text or speech from one language to another (Language Translation), analyze text data to determine the sentiment expressed (Sentiment Analysis), and identify and classify entities mentioned in text data, such as names of people, organizations, or locations (Named Entity Recognition (NER));

Computer Vision and Object Detection: AI agents can identify and locate objects within images or videos;

Image Classification: AI agents can classify images into predefined categories;

Facial Recognition: AI agents can recognize and identify human faces in images or videos;

Data Analysis and Predictive Modeling: AI agents can analyze historical data to make predictions about future events or trends (Predictive Analytics), identify unusual patterns or outliers in data (Anomaly Detection) and forecast future values based on historical time series data (Time Series Forecasting);

Healthcare: AI agents can assist healthcare professionals in diagnosing diseases and medical conditions based on patient data. and can analyze patient data to recommend personalized treatment plans;

Finance: AI agents can analyze financial data and facilitate transactions, identify fraudulent activities by analyzing financial transactions and assess the creditworthiness of individuals or businesses based on their financial history;

Virtual Reality (VR) and Augmented Reality (AR): AI agents can enhance user experiences in VR and AR applications by providing intelligent interactions and personalized content;

Cybersecurity: Intrusion Detection: AI agents can detect and respond to security threats in computer networks;

Malware Detection: AI agents can identify and neutralize malicious software; and Content Creation: AI agents can generate text, images, music, and other forms of content automatically.

AI agents can be linked to NFTs in several ways: Ownership and Authentication: NFTs can be used to prove ownership and authenticate AI agents. Each AI agent can be represented by a unique NFT, and ownership of the agent can be transferred via the NFT;

Training Data and Model: NFTs and their associated metadata can represent the training data used to train the AI agent or the model itself. This can ensure the transparency of the AI's capabilities and its training data;

Royalties and Intellectual Property Rights: NFTs can also be used to manage royalties and intellectual property rights associated with AI agents. Creators can receive royalties whenever their AI agents are used;

Marketplaces and Trading: NFT marketplaces can facilitate the trading of AI agents. Creators can sell, buy, or exchange AI agents using NFTs, with the ownership of the AI agent being transferred along with the NFT;

Customization and Upgrades: NFTs can represent unique features, attributes, or upgrades of AI agents. For example, owners can share or grant temporary access to NFTs to advertisers or approved third parties to represent these features and allow them to apply AI agents to customizing or personalizing communication according to preferences; and Provenance and History: NFTs can store the provenance and history of an AI agent, including its previous owners, usage history, and any modifications made to it.

By linking AI agents to NFTs, creators can ensure ownership, authenticity, and traceability, while also providing a platform for trading, sharing, accessing, customizing, and monetizing data accessible by AI agents.

AI agents can create necessary reports, analytics, and actions that may provide business, marketing or any other benefits, including aggregating information from the physical and virtual locations where such data and experiences are stored or delivered.

Various cloud vendors provide platforms and services that support the development and deployment of AI agents. These cloud vendors are continuously adding support features, improved capability and services in support of their cloud offerings. Some of the major providers include Amazon Web Services (AWS) (Amazon Lex: A service for building conversational interfaces into any application using voice and text; Amazon Polly: A service that turns text into lifelike speech, allowing users to create applications that talk; Amazon Rekognition: A service for adding image and video analysis to applications; Amazon Comprehend: A natural language processing (NLP) service for understanding the content of text documents; Amazon SageMaker: A fully managed service that provides developers and data scientists with the ability to build, train, and deploy machine learning (ML) models); Microsoft Azure (Azure Bot Service: A service that enables you to build intelligent, enterprise-grade bots that help enrich the customer experience while reducing costs; Azure Cognitive Services: A set of APIs, SDKs, and services available to help developers build intelligent applications without having direct AI or data science skills; Azure Machine Learning: A cloud-based environment that a user can use to train, deploy, automate, and manage machine learning models0; Google Cloud Platform (GCP) (Google Dialogflow: A natural language understanding platform that makes it easy to design and integrate a conversational user interface into mobile app, web application, device, bot, interactive voice response system, and more; Google Cloud Speech-to-Text and Text-to-Speech: APIs for converting audio to text and vice versa; Google Cloud Vision API: Enables developers to understand the content of an image by encapsulating powerful machine learning models in an easy-to-use REST API; and Cloud Natural Language API: Provides natural language understanding technologies to developers).

These cloud vendors offer a wide range of AI and machine learning tools and services, enabling developers to create sophisticated AI agents, chatbots and virtual assistants.

A. Artificial Intelligence for Gathering and Analyzing Data

FIG. 4 is a block diagram further illustrating the elements of the LogicWare with blockchain and Web3 interfaces.

Figure 6:
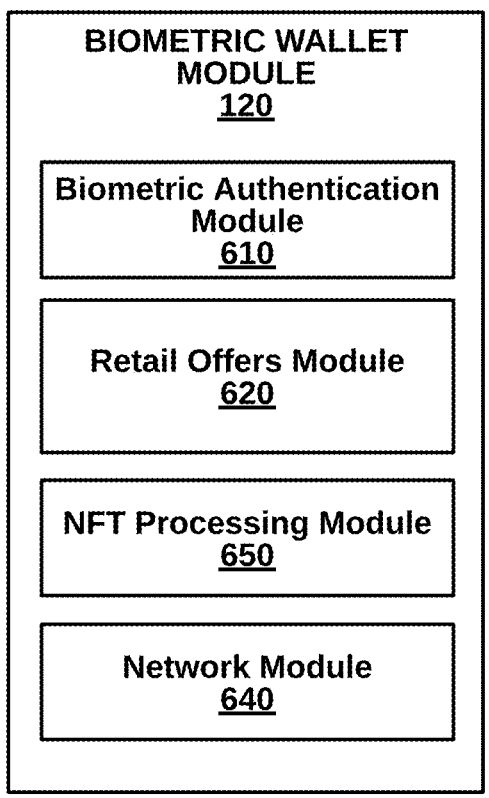
FIG. 6 is a more detailed block diagram illustrating a smart or a biometric wallet module of the system of FIG. 1, according to an embodiment.

The system depicted in FIG. 6 abstracts away many of the complexities involved in building and operationalizing AI systems, enabling developers and applications to focus on leveraging AI capabilities rather than dealing with low-level infrastructure concerns. AI Foundation 660 refers to the underlying platform enabling the integration and deployment of AI capabilities with LogicWare. The AI Foundation serves as a common layer that provides essential services and components required for developing, deploying, and managing AI models and applications. AI Foundation may be part of the Logicware 110, deployed as SDKs or made available to Logicware via APIs. AI Foundation may include or support the following key elements:

Data ingestion and preprocessing: Components for collecting, cleaning, and preprocessing data from various sources to prepare it for use in AI models.

Model development and training: Tools and environments for building, training, and evaluating AI models 602, such as machine learning, deep learning, or natural language processing models.

Model management: Services for versioning, storing, and managing trained AI models 602, as well as monitoring their performance and updating them as needed.

Inference and deployment: Mechanisms for deploying trained AI models into production environments, allowing applications and systems to consume and leverage the AI capabilities.

Scalability and performance: Infrastructure 640 and services that enable the efficient scaling and high-performance execution of AI workloads, often involving specialized hardware like GPUs or TPUs and cloud-based services.

Security and governance: Mechanisms for ensuring the secure and compliant use of AI models, including access control, auditing, and adherence to regulatory requirements.

Integration and APIs: Interfaces with Application Integrations 630 and APIs that allow other applications and systems to seamlessly integrate and consume the AI capabilities provided by the foundation such as process systems 621-626 . . . .

AI Foundation 660 aims to provide a standardized and consistent platform for AI development and deployment with Logicware 110, across the organization, promoting reusability, scalability, and governance of AI solutions. Some of the features of the AI Foundation 660, may also integrate with cloud, CRM, CMS and other systems via Application Integrations 620.

AI Data 650 refers to the information used to train and develop artificial intelligence systems. This data can be in various forms, such as text, images, audio, or numerical data, depending on the application of the AI system. Ensuring the quality, relevance, and diversity of AI data is crucial for building accurate and unbiased AI models. AI data can be both structured and unstructured:

1) Structured data refers to information that is organized and formatted in a predefined way, such as databases, spreadsheets, or labeled datasets. This type of data is typically used for tasks like classification, regression, or structured prediction problems.

2) Unstructured data, on the other hand, refers to information that does not have a predefined format or structure, such as text documents, images, audio files, or social media posts. This type of data requires more preprocessing and feature extraction techniques before it can be used for training AI models.

3) Many AI applications, especially in areas like natural language processing (NLP) and computer vision, rely heavily on unstructured data, while structured data is more commonly used in fields like finance, healthcare, and manufacturing.

Logicware works with both structured and unstructured data which can also be integrated via application integrations 620.

AI infrastructure 640 refers to the combination of hardware and software resources required to develop, train, and deploy artificial intelligence systems effectively. It includes powerful computing resources, such as GPUS, TPUs, or specialized AI accelerators, to handle the computationally intensive tasks involved in training large AI models. AI infrastructure also encompasses the software platforms, frameworks, and tools used for data preprocessing, model building, training, and inferencing, which may also be a part of the AI Foundation. Additionally, AI Infrastructure 640 may involve storage and data management solutions to handle the vast amounts of data required for AI model training. The system in FIG. 6 enables robust AI infrastructure is crucial for organizations to scale their AI initiatives and achieve efficient model development and deployment cycles.

III. Methods for Biometric Crypto Wallet Security (FIG. 7-8)

Figure 7:
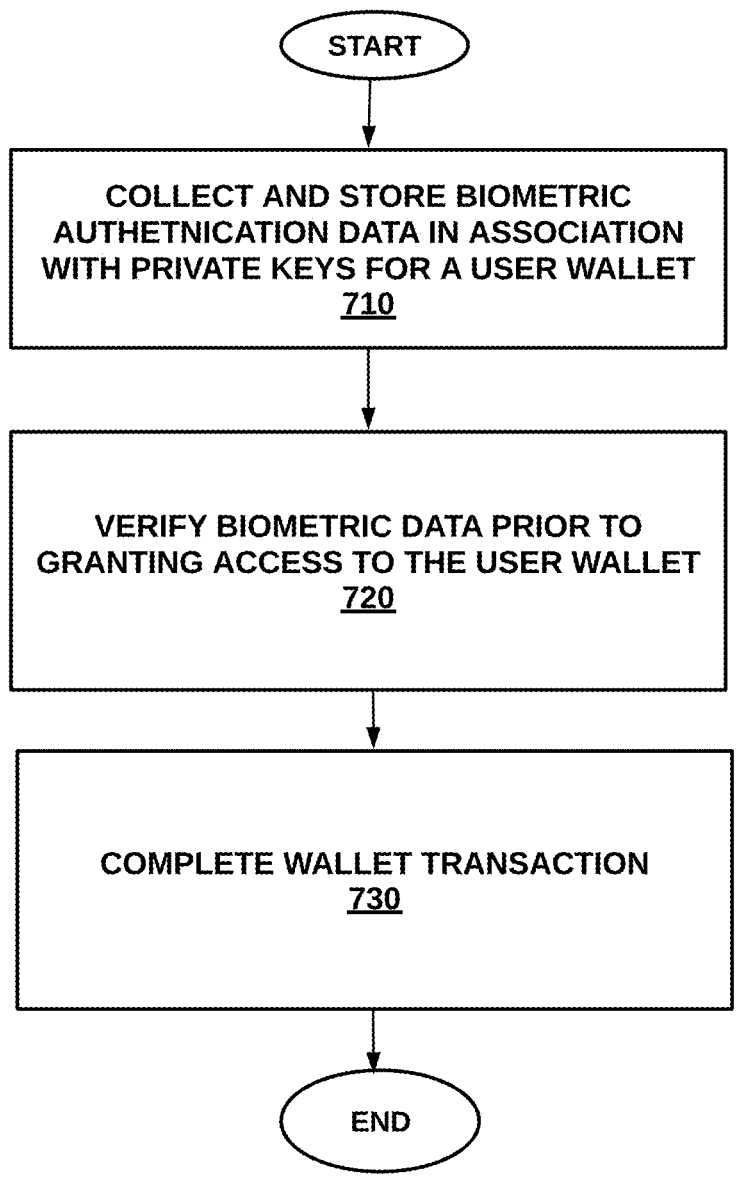
FIG. 7 is a high-level flow diagram illustrating a method for protecting private keys for crypto wallets with user biometrics, according to one embodiment.

FIG. 7 is a high-level flow diagram illustrating a method 400 for protecting private keys for crypto wallets with user biometrics, according to one embodiment. At step 710, Biometric authentication data is collected and stored in association with private keys for a user wallet. When a user attempts to access an NFT or other aspects of the wallet, at step 720, biometric data is collected prior to release. At step 730, once authenticated, wallet transactions are completed.

Figure 8:
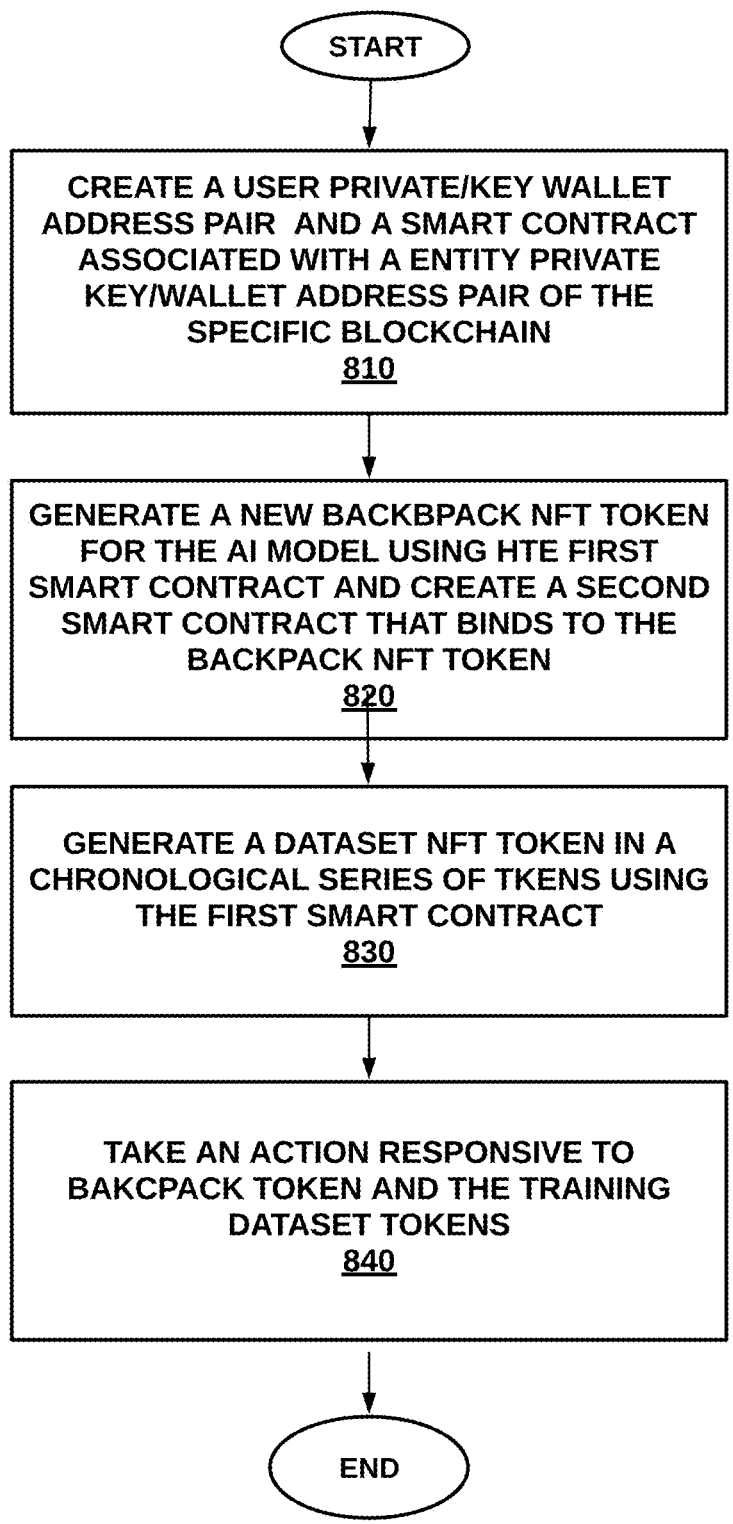
FIG. 8 is a more detailed flow diagram illustrating an alternative method for protecting private keys for crypto wallets with user biometrics, according to one embodiment.

FIG. 8 is a more detailed flow diagram illustrating an alternative method 800 for protecting private keys for crypto wallets with user biometrics, according to one embodiment. Various other components and modules can be added to the NFT Engine to accommodate customized NFT requirements.

At step 810, an entity private key/wallet address pair associated with a specific enterprise is created.

At step 820, a first smart contract is created using the entity private key/wallet address pair.

At step 830, using the first smart contract, a new backpack NFT token representing the AI model is generated.

At step 840, a second smart contract that binds to the backpack NFT token is created.

At step 850, using the first smart contract, generating a dataset NFT token in a chronological series of tokens, representing the training dataset that the AI model was trained with. The dataset NFT token is bound to the second smart contract and the backpack NFT token.

At step 860, an action an action is taken, responsive to backpack token and the training dataset tokens of the series of tokens.

III. Computing Device for Biometric Crypto Wallet Security (FIG. 9)

Figure 9:
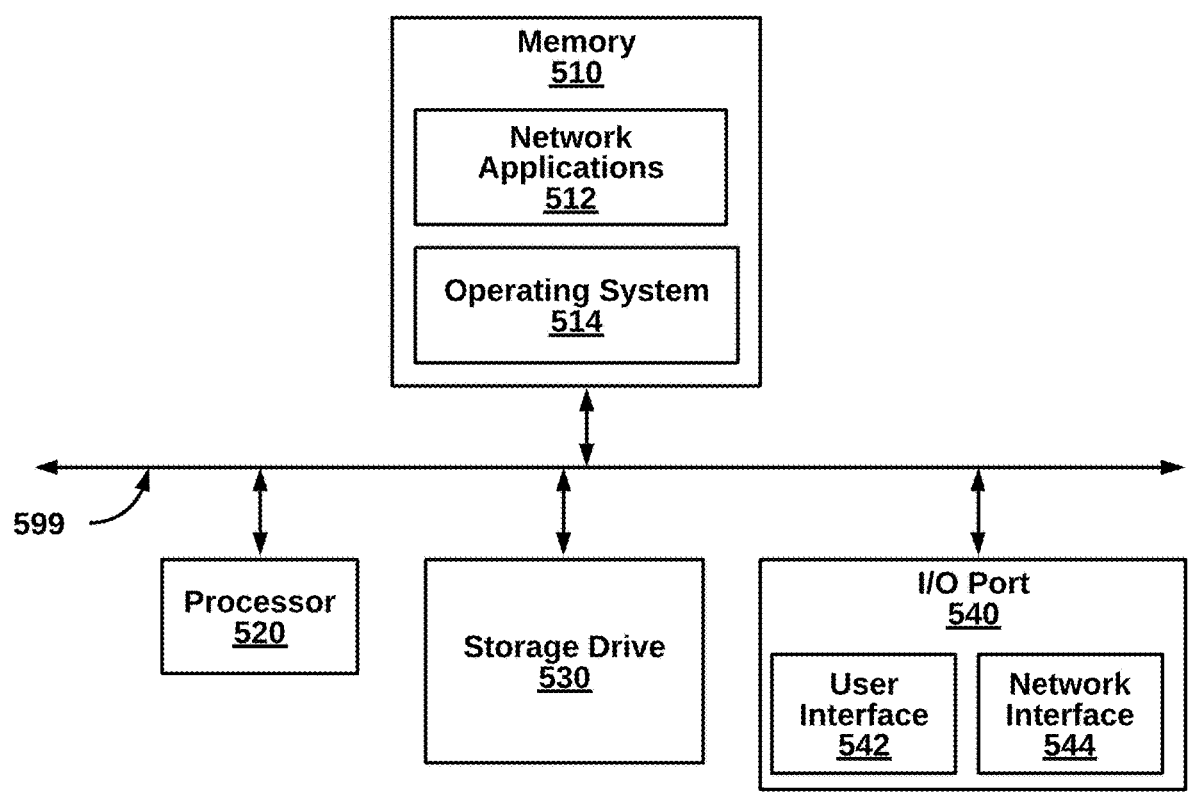
FIG. 9 is a block diagram illustrating an example computing device for the system of FIG. 1, according to one embodiment.

FIG. 9 is a block diagram illustrating a computing device 00 for use in the system 100 of FIG. 1, according to one embodiment. The computing device 500 is a non-limiting example device for implementing each of the components of the system 100, including NFT engine 110, smart or a biometric wallet module 120 and a consumer device 130. Additionally, the computing device 500 is merely an example implementation itself, since the system 100 can also be fully or partially implemented with laptop computers, tablet computers, smart cell phones, Internet access applications, and the like.

The computing device 500, of the present embodiment, includes a memory 510, a processor 520, a hard drive 530, and an I/O port 540. Each of the components is coupled for electronic communication via a bus 599. Communication can be digital and/or analog, and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access application, or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X etc, Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing element. The processor 520 can be disposed on silicon or any other suitable material. The processor 520 can receive and execute instructions and data stored in the memory 510 or the hard drive 730.

The storage device 530 can be any non-volatile type of storage such as a magnetic disc, EPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a system, on a data communication network, for providing immutable information about artificial intelligence (AI) models and their training datasets, deployed by an entity, secured and observed with a non-fungible cryptographic token (NFT) based observation certificate, the method comprising:
    creating an entity private key/wallet address pair associated with a specific enterprise;
    creating a first smart contract using the entity private key/wallet address pair;
    using the first smart contract, generating a backpack NFT token representing the AI model;
    creating a second smart contract that binds to the backpack NFT token;
    using the first smart contract, generating a dataset NFT token in a chronological series of tokens, representing the training dataset that the AI model was trained with;
    wherein the dataset NFT token is bound to the second smart contract and the backpack NFT token; and
    taking an action, responsive to the backpack NFT token and the training dataset NFT token of the series of tokens.

2. The method of claim 1, wherein the backpack NFT token binds, across one or more applications, one or more of: user digital identity, user behavior, user attribute, user data, and user credentials.

3. The method of claim 1, wherein each newly created NFT token of the chronological series of tokens is appended as an immutable entry.

4. The method of claim 1, wherein the entity private key/wallet address pair is associated with a specific electronic device.

5. The method of claim 1, further comprising collecting, encrypting, hashing and storing authentication data in association with the private keys for a user wallet, wherein the entity private key/wallet address pair utilizes the biometric authentication data prior to completing a transaction.

6. The method of claim 1, wherein the training data set is created by multiple entities working collaboratively, and each piece of data is attributed to a responsible party.

7. The method of claim 1, wherein royalties are assigned according to the responsible party for the piece of data.

8. The method of claim 1, wherein the dataset is embedded with location information.

9. The method of claim 1, wherein an NFT engine for minting NFTs and a biometric wallet for storing NFTs, are embedded in a single physical device, wherein the device accesses a data network for transactions.

10. The method of claim 1, wherein an NFT engine mints NFTs automatically according to one or more rule-triggered events.

11. The method of claim 1, wherein datasets are minted as NFTs according to at least one of the formats: ERC721, ERC1155, ERC998, ERC6551 and ERC4337.

12. The method of claim 1, wherein the dataset comprises at least one of: pictures, audio, text, video and multimedia content.

13. The method of claim 1, further comprising recording an attested hash on an NFT, along with metadata about an attesting entity and an attestation type, wherein a smart contract confirms an attestation exists and is valid, without revealing actual underlying data.

14. A system, on a data communication network, for providing immutable information about artificial intelligence (AI) models and their training datasets, deployed by an entity, secured and observed with a non-fungible cryptographic token (NFT) based observation certificate, the system comprising:
- a processor;
- a network interface communicatively coupled to the processor and to a data communication network; and
- a memory, communicatively coupled to the processor and storing source code, comprising:
  - a first module to, when executed by the processor, create an entity private key/wallet address pair associated with a specific enterprise;
  - a second module to, when executed by the processor, create a first smart contract using the entity private key/wallet address pair;
  - a third module to, when executed by the processor, use the first smart contract, generate a new backpack NFT token representing the AI model;
  - a fourth module to, when executed by the processor, create a second smart contract that binds to the backpack NFT token;
  - a fifth module to, when executed by the processor, use the first smart contract, generate a dataset NFT token in a chronological series of tokens, representing the training dataset that the AI model was trained with; wherein the dataset NFT token is bound to the second smart contract and the backpack NFT token; and
  - a sixth module to, when executed by the processor, take an action, responsive to backpack token and the training dataset tokens of the series of tokens.

15. The system of claim 14, wherein the backpack NFT token permanently binds, across one or more applications, one or more of: user digital identity, user data, and user credentials.

16. The system of claim 14, wherein each newly created NFT token of the chronological series of tokens is appended as an immutable entry.

17. The system of claim 14, wherein an entity private key/wallet address pair is associated with a specific electronic device controlled by the enterprise.

18. The system of claim 14, further comprising collecting, encrypting, hashing and storing biometric authentication data in association with the private keys for a user wallet, wherein the entity private key/wallet address pair utilizes the biometric authentication data prior to completing a transaction.

19. The system of claim 14, wherein the training data set is created by multiple entities working collaboratively, and each piece of data is attributed to a responsible party.

20. A non-transitory computer-readable medium in a system, on a data communication network, storing code that when executed, performs a method for providing immutable information about artificial intelligence (AI) models and their training datasets, deployed by an entity, secured and observed with a non-fungible cryptographic token (NFT) based observation certificate, the method comprising:
- creating an entity private key/wallet address pair associated with a specific enterprise;
- creating a first smart contract using the entity private key/wallet address pair;
- using the first smart contract, generating a new backpack NFT token representing the AI model;
- creating a second smart contract that binds to the backpack NFT token;
- using the first smart contract, generating a dataset NFT token in a chronological series of tokens, representing the training dataset that the AI model was trained with; wherein the dataset NFT token is bound to the second smart contract and the backpack NFT token; and
- taking an action, responsive to backpack token and the training dataset tokens of the series of tokens.

\* \* \* \* \*